(12) United States Patent  
Takahashi et al.

(10) Patent No.: US 7,613,680 B2
(45) Date of Patent: Nov. 3, 2009

(54) COMPUTER SYSTEM AND THE COMPUTER CONTROL METHOD

(75) Inventors: Kenta Takahashi, Yokohama (JP); Tetsuya Hashimoto, Kawasaki (JP); Naoki Ikawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 425 days.

(21) Appl. No.: 11/196,687

(22) Filed: Aug. 4, 2005

(65) Prior Publication Data

US 2006/0253457 A1 Nov. 9, 2006

(30) Foreign Application Priority Data

May 6, 2005 (JP) ............................. 2005-134786

(51) Int. Cl.
*G06F 17/30* (2006.01)
*G06F 15/16* (2006.01)
(52) U.S. Cl. .................................. 707/2; 707/1; 707/10
(58) Field of Classification Search ....................... None
See application file for complete search history.

(56) References Cited

U.S. PATENT DOCUMENTS

2002/0120599 A1* 8/2002 Knouse et al. ................. 707/1

FOREIGN PATENT DOCUMENTS

JP 2003-178040 6/2003

* cited by examiner

*Primary Examiner*—Tony Mahmoudi
(74) *Attorney, Agent, or Firm*—Antonelli, Terry, Stout & Kraus, LLP.

(57) ABSTRACT

A computer system having a plurality of computers for responding to a request from a client and a running management computer for managing said plurality of computers, wherein: the running management computer includes a storage unit and a processing unit; the storage unit stores a target value of performance information on a response time to the request, for each URL pattern of the request; and the processing unit monitors the performance information on the response time to the request, for each URL pattern of the request, and judges whether or not the monitored performance information read from the storage unit satisfies the target value of the performance information, to execute load distribution by moving a Web content corresponding to the URL pattern of the request not satisfying the target value of the performance information, to another computer.

10 Claims, 10 Drawing Sheets

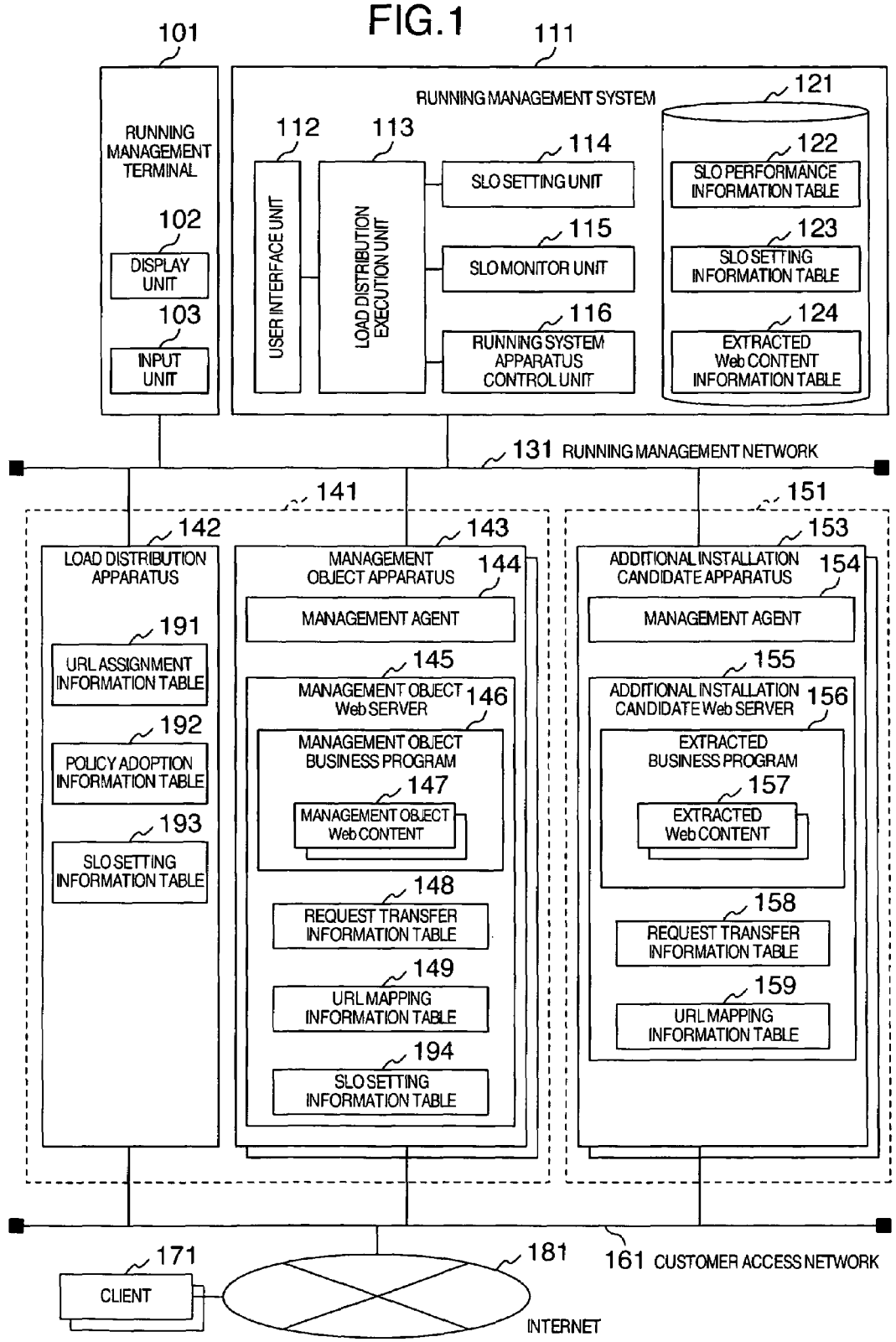

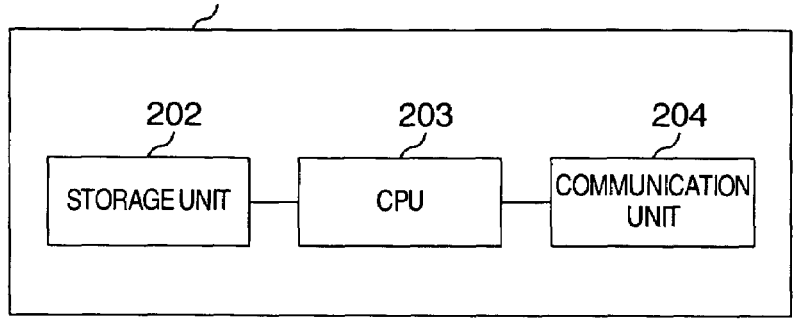
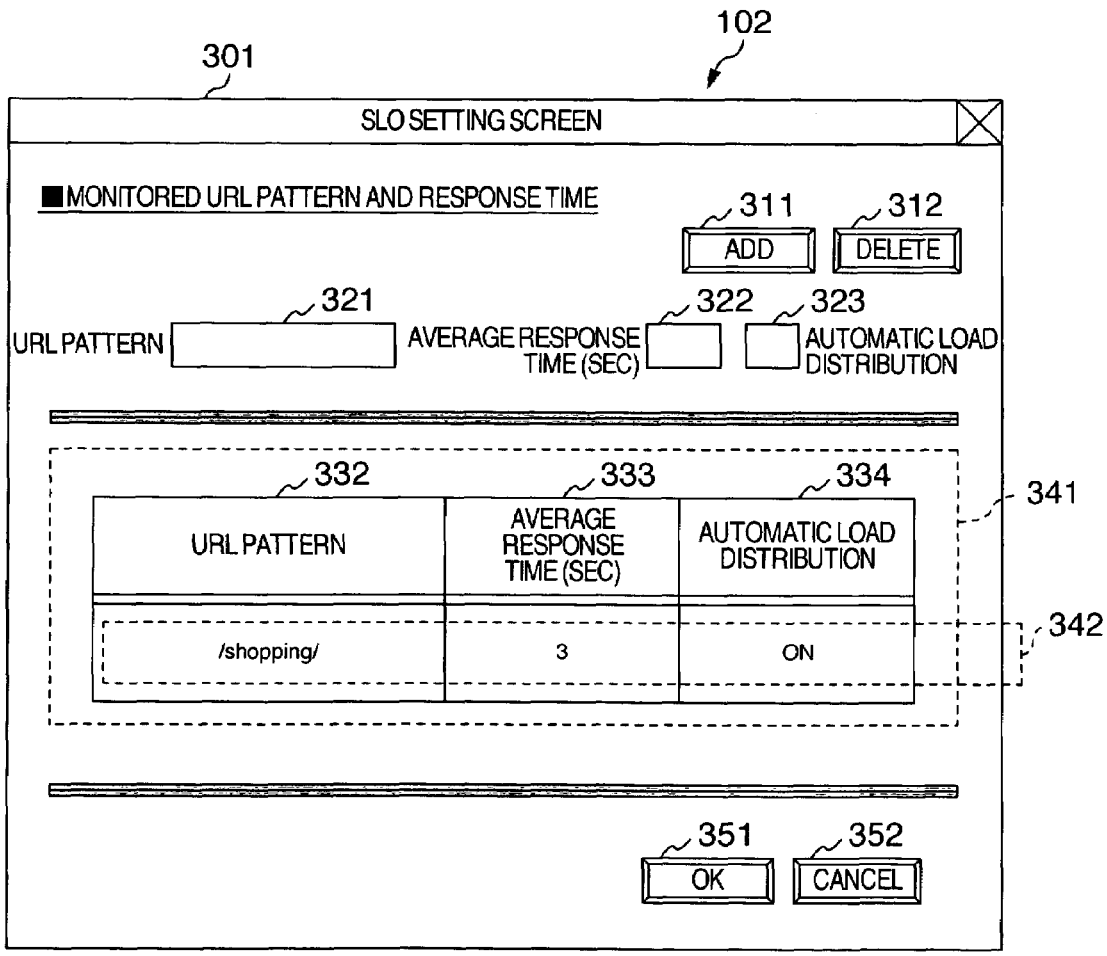

| REQUEST URL ~411 | AVERAGE RESPONSE TIME (SEC) ~412 | AVERAGE SERVER PROCESSING TIME (SEC) ~413 | ACCESS NUMBER ~414 |
|---|---|---|---|
| http://a.com/shopping/index.html | 3.897 | 0.804 | 35464783 | ~421
| http://a.com/shopping/img/item1.jpg | 2.523 | 2.304 | 35464782 | ~422
| ... | ... | ... | ... |

| URL PATTERN ~512 | AVERAGE RESPONSE TIME (SEC) ~513 | AUTOMATIC LOAD DISTRIBUTION ~514 |
|---|---|---|
| /shopping/ | 3 | ON | ~521

| URL ~602 | HOST IP ~603 | STORAGE LOCATION OF Web CONTENT ~604 |
|---|---|---|
| http://a.com/shopping/img/item1.jpg | 192.168.10.24 | C:¥somewhere1¥shopping¥img¥item1.jpg | ~611
| ... | ... | ... |

| URL ~702 | HOST IP ~703 | STORAGE LOCATION OF Web CONTENT ~704 |
|---|---|---|
| http://a.com/shopping/img/item1.jpg | 192.168.10.24 | C:¥somewhere1¥shopping¥img¥item1.jpg | ~711
| ... | ... | ... |

| POLICY NAME ~801 | URL PATTERN ~803 | HOST GROUP ~805 | HOST ~807 |
|---|---|---|---|
| Policy1 | /shopping/ | HostGroup1 | 192.168.10.24 | ~811
| Policy2 | /shopping/img/item1.jpg | HostGroup2 | 192.168.10.26 | ~813
| ... | ... | ... | ... |

| VIRTUAL IP ADDRESS ~901 | POLICY ADOPTION ORDER ~903 |
|---|---|
| 10.1.1.1 ~925 | Policy1 ~921 |
|  | Policy2 ~923 |
| ... | ... |

| URL PATTERN (1002) | HOST GROUP (1003) | HOST IP (1004) |
|---|---|---|
| /purchase/ | HostGroup1 | 192.168.1.21 |
|  |  | 192.168.1.22 |
|  |  | 192.168.1.23 |
| ... | ... | ... |

| URL PATTERN (1102) | Web CONTENT STORAGE FOLDER (1103) |
|---|---|
| /shopping/ | C:¥somewhere1¥shopping |
| /items/ | C:¥somewhere2¥items |
| ... | ... |

1111

COMPUTER SYSTEM AND THE COMPUTER CONTROL METHOD

BACKGROUND OF THE INVENTION

The present invention relates to a computer system capable of improving a response performance to a request from a client.

A main trend of recent information systems is a Web-based business system (hereinafter called a "Web system") constituted of a plurality of system apparatuses including network apparatuses, a Web server group, an AP server group and a DB server group.

A number of unspecified clients access a Web system via the Internet so that a large number of accesses are concentrated in some cases. If accesses are concentrated upon the Web system and responses to users are delayed, users become reluctant to access the Web system. An enterprise running the Web system may lose business chances.

In order to deal with this problem, load distribution has been introduced conventionally. For example, the load is distributed by additionally installing a new server group to the Web system to shorten response times to users.

It is generally known that this load distribution method by additional installation is performed in the unit of business application. Namely, load distribution is performed by additionally installing as one unit a server group installing a business program group which constitutes a business application.

This load distribution method by additional installation in the unit of business application is not necessary to change parameters regarding a dependency relation (configuration, substitution control and the like) between servers to be additionally installed and between business programs. This method can therefore be performed relatively easily without halting the Web system.

There occurs, however, a problem that a large amount of system resources (hardware) is required because a server group installed with a business program group having a small load is also used as an additional installation object.

Furthermore, in a case that a load is concentrated upon a particular Web content in the business program and this load concentration adversely affects another Web content processed in the same business program, even if the load distribution method by additional server installation is performed, a response time to a client accessing the other Web content is not improved so much in some cases.

If a server group to be additionally installed and used between a plurality of Web systems has a large capacity of business programs, an installation time of the business programs to servers is prolonged.

In an urgent case not expected by a running manager, such as upon abrupt occurrence of a high load on a Web system, the installation time may become a bottleneck.

As one example of load distribution techniques through additional installation, JP-A-2003-178040 discloses techniques of calculating and deciding the number of servers to be additionally installed in accordance with performance information on a server group constituting a Web system. According to the techniques disclosed in JP-A-2003-178040, additional installation is performed on a server unit basis, so that the problem of using a large amount of system resources can be mitigated more than load distribution through additional installation on a business application basis.

According to JP-A-2003-178040, however, if a load is applied to a particular Web content in a business program, there is a possibility that a response time to another Web content is not improved so much even if the load is distributed through additional installation.

SUMMARY OF THE INVENTION

The present invention has been made in consideration of the above-described problems and aims to efficiently distribute a load on a computer system by extracting Web contents having a high load.

In order to solve the above-described issues, the present invention provides a computer system having a plurality of computers for responding to a request from a client and a running management computer for managing the plurality of computers, wherein: the running management computer includes a storage unit and a processing unit; the storage unit stores a target value of performance information on a response time to the request, for each URL pattern of the request from the client; and the processing unit monitors the performance information on the response time to the request, for each URL pattern of the request, and judges whether or not the monitored performance information read from the storage unit satisfies the target value of the performance information, to perform load distribution by moving a Web content corresponding to the URL pattern of the request not satisfying the target value of the performance information, to another computer.

BRIEF DESCRIPTION OF THE DRAWINGS

FIG. 1 is a diagram showing an overall configuration of a computer system according to an embodiment.

FIG. 2 is a diagram showing a hardware structure of each apparatus shown in FIG. 1.

FIG. 3 is a diagram showing an example of an SLO setting screen displayed on a display unit of a running management terminal.

FIG. 4 is a detailed diagram of an SLO performance information table.

FIG. 5 is a detailed diagram of an SLO setting information table.

FIG. 6 is a detailed diagram of an extracted Web content information table.

FIG. 7 is a diagram showing an example of a screen displaying the extracted Web content information table.

FIG. 8 is a detailed diagram of a URL assignment information table.

FIG. 9 is a detailed diagram of a policy adoption information table in a load distribution apparatus.

FIG. 10 is a detailed diagram of a request transfer information table possessed by a management object Web server.

FIG. 11 is a detailed diagram of a URL mapping information table possessed by the management object Web server.

DESCRIPTION OF THE EMBODIMENTS

Figure 12:
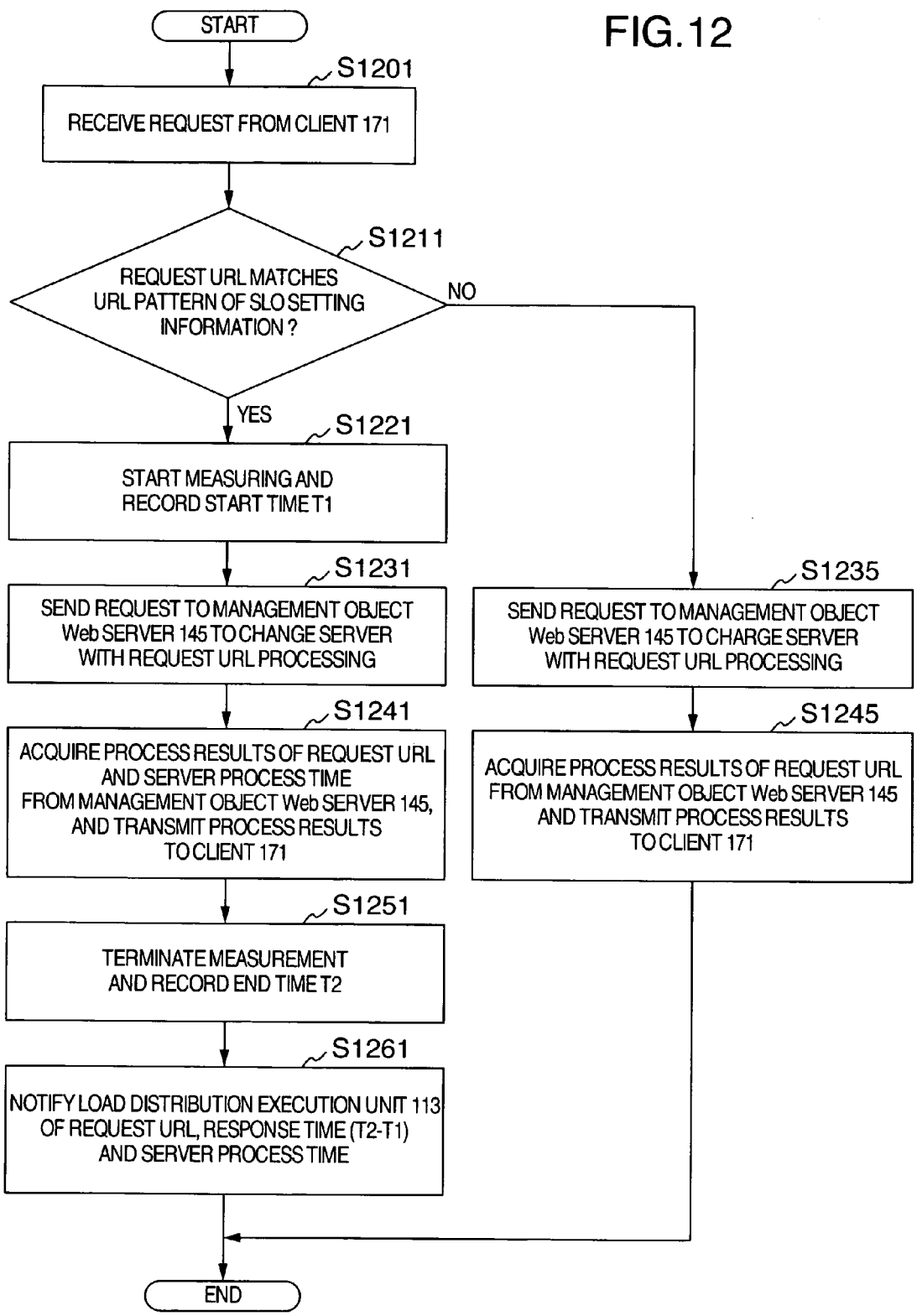
FIG. 12 is a flow chart illustrating a performance monitoring process to be executed by the load distribution apparatus in accordance with the SLO setting information.

With reference to the accompanying drawings, description will be made on load distribution of a business system according to an embodiment of the present invention.

First, with reference to FIG. 1, the overall configuration of the embodiment will be described. FIG. 1 is a diagram showing the overall configuration of a business system according to the embodiment.

A web system 141 as a business system is connected to a running management terminal 101 and a running management system (running management computer) 111 via a running management network 131, and to clients 171 via a customer access network 161 and the Internet 181.

The running management terminal 101 is used by a running manager to perform settings and controls of the running management system 111, constituted of a display unit 102 and an input unit 103, and can be realized by, for example, a personal computer.

The display unit 102 such as a personal computer displays text and image data. The input unit 103 such as a keyboard and a mouse is used by a running manager to input data.

The running management terminal 101 is connected to the running management system 111 via the running management network 131.

The running management terminal 101 may be structured integrally with the running management system 111.

The running management system 111 is constituted of a user interface unit 112, a load distribution execution unit 113, an SLO setting unit 114, an SLO monitor unit 115, a running system apparatus control unit 116 and a storage (storage unit) 121. The running management system 111 is connected to the running management terminal 101, a load distribution apparatus 142, management object apparatuses (computers) 143 and additional installation candidate apparatuses (computers) 153, via the running management network 131.

The user interface unit 112 is a program (including a module and the like: this inclusion is also applicable to the term "program" in the following description) for providing a user interface for setting a service level objective (objective value; hereinafter called an "SLO") of the Web system 141 to the running management terminal 101.

SLO is an objective value (target value) of performance information on a response time to a request. For example, SLO is a time taken to return (transfer) process results by the server to a client after the load distribution apparatus receives the request from the client.

The load distribution execution unit 113 is a program having a function such as collective controls of the SLO setting unit 114, SLO monitor unit 115 and running system apparatus control unit 116.

The SLO setting unit 114 is a program having a function of managing SLO setting information set via the user interface unit 112.

The SLO monitor unit 115 is a program having a function of managing and monitoring performance information regarding the SLO setting information.

The running system apparatus control unit 116 is a program having a function of controlling the Web system 141 and an additional installation candidate group 151.

The load distribution execution unit 113 can process an event notice (a notice indicating, for example, a request from a client 171) from the load distribution apparatus 142.

The storage 121 is constituted of an SLO performance information table 122, an SLO setting information table 123 and an extracted Web content information table 124.

The SLO performance information table 122 is a table in which the SLO monitor unit 115 stores data.

The SLO setting information table 123 is a table in which the SLO setting unit 114 stores data.

The extracted Web content information table 124 is a table in which the load distribution execution unit 113 stores data.

The storage 121 may be any storage unit such as a hard disk if it can store data. The SLO performance information table 122, SLO setting information table 123 and extracted Web content information table 124 may be stored not in the running management system but in another apparatus connected to the running management network 131.

The Web system 141 is constituted of the load distribution apparatus 142 and a plurality of management object apparatuses 143 (hereinafter called a "host"), and these apparatuses are connected to the customer access network 161 and running management network 131.

The Web system 141 is accessed by a plurality of clients 171 via the Internet 181.

The load distribution apparatus 142 has: a URL assignment information table (request assignment table) 191 for storing information on pairs of URL patterns (hereinafter called a "request pattern") and corresponding assignment destination hosts, the collected pairs being used as a policy; a policy adoption information table 192 for storing information on pairs of IP addresses of virtual servers and adopted policies; and an SLO setting information table 193 for storing the same data as that in the SLO setting information table 123 in the storage 121.

The running system apparatus control unit 116 in the running management system 111 controls the load distribution apparatus 142 by executing transmission/reception of a command string by Telnet or the like and a setting file by the File Transfer Protocol (FTP), Trivial File Transfer Protocol (TFTP) or the like.

The management object apparatus 143 is constituted of a processor, a memory, a disk storage, a network interface and the like, and various processes of a server and the like run on an operating system (OS).

The management object apparatus 143 has a management agent 144 and a management object Web server 145, the management agent being a program for managing the server in the apparatus.

The management object Web server 145 is a server (software) controlled by the management agent 144 which receives a command from the running system apparatus control unit 116.

The management object Web server 145 has: a management object business program 146 which is one factor of a business application; a request transfer information table 148 for storing pair information of URL patterns and transfer destination AP servers; a URL mapping information table 149 for storing pair information of URL patterns and Web content storage folders; and an SLO setting information table 194 for storing the same data as that in the SLO setting information table 123 in the storage unit 121. The object business program 146 has a plurality of management object Web contents 147.

A suitable example of the management object Web server 145 is an HTTP server of Apache Foundation Software (hereinafter simply called "Apache"). In this case, the URL mapping information stable 149 stores a portion of the contents of setting files of the HTTP server.

A suitable example of the request transfer information table 148 is the contents of a setting file of Jakarta Tomcat Connection which is a redirect function between a Web server and an AP server in the Apache Jakarta Project.

In this embodiment, although it is assumed that the Web system 141 uses Java 2 Platform, Enterprise Edition: registered trademark (J2EE), the embodiment is not limited only to J2EE (registered trademark).

The additional installation candidate apparatus group 151 has a plurality of additional installation candidate apparatuses 153 which are installed for load distribution execution.

Similar to the management object apparatus 143, the additional installation apparatus 153 is constituted of a processor, a memory, a disk storage, a network interface and the like, and various processes run on OS.

The additional installation candidate apparatus 153 has a management agent 154 and an additional installation candidate Web server 155, the management agent being a program for managing the server in the apparatus.

The running system apparatus control unit 116 of the running management system 111 controls the additional installation candidate Web server 155 by communicating with the management agent 154.

The additional installation Web server 155 is a server (software) having a request transfer information table 158 and a URL mapping information table 159. The additional installation Web server 155 disposes as an extracted business program 156 a collection of a plurality of Web contents 157, when load distribution is executed.

Next, with reference to FIG. 2 (and FIG. 1 when necessary), description will be made on a hardware structure of each apparatus shown in FIG. 1. FIG. 2 is a diagram showing the hardware structure of each apparatus shown in FIG. 1.

An information processing apparatus 201 is a computer corresponding to each of the running management system 111, load distribution apparatus 142, management object apparatus 143 and additional installation candidate apparatus 153, and is constituted of a storage unit 202, a Central Processing Unit (CPU, processor) 203 and a communication unit 204.

The storage unit 202 stores information on various programs, various tables, various contents and the like, and can be realized by a memory, a Read Only Memory (ROM), a hard disk or the like.

CPU 203 executes various arithmetic processings in accordance with information (user interface unit 112 shown in FIG. 1 and the like) such as various programs stored in the storage unit 202.

The communication unit 204 is a communication interface to be used for communicating with other apparatuses.

Next, with reference to FIG. 1, description will be made on a rough process flow of the embodiment.

First, a running manager of the Web System 141 operates the input unit 103 of the running management terminal 101 to access the running management system 111 via the running management network 131.

The running management system 111 urges the running manager to set SLO by displaying setting items (refer to FIG. 3) on the display unit 102 of the running management terminal 101 by using the user interface unit 112. The running manager enters each setting item of SLO by using the input unit 103 and thereafter sends a completion notice to the running management system 111.

Upon reception of the completion notice, the load distribution execution unit 113 updates the SLO setting information table 123 by using the SLO setting unit 114. At the same time, the load distribution execution unit 113 notifies the load distribution apparatus 142 of the contents of the SLO setting information, by using the running system apparatus control unit 116, and notifies the management object Web server 145 of the contents of the SLO setting information, via the management agent 144.

Next, upon reception of a request from a client 171, the load distribution apparatus 142 refers to a URL contained in the request (hereinafter called a "request URL") and to the SLO setting information table 123 in the running management system 111. If URL belongs to a URL pattern of an SLO monitor object, then the load distribution apparatus 142 transfers the request to the management object Web server 145 and measures a response time to the request URL.

The response time is a time taken to return (transfer) the process results by the management object apparatus 143 to the client 171 after the load distribution apparatus 142 receives the request from the client 171.

The management object server 145 to which the request was transferred refers to the request URL and the SLO setting information table 123, similar to the load distribution apparatus 142. If the request belongs to the URL pattern of the SLO monitor object, then the management object Web server 145 measures the server process time and sends the server process time relative to the request URL and the process results to the load distribution apparatus 142.

After the process results for the request are returned to the client 171, the load distribution apparatus 142 notifies the load distribution execution unit 113 of the request URL, response time and server process time. Upon reception of this notice, the load distribution execution unit 113 updates the SLO performance information table 122 by using the SLO monitor unit 115.

The SLO monitor unit 115 periodically checks the SLO performance information table 122 as to whether there is any request URL which exceeds (does not satisfy) SLO, and if there is the request URL exceeding SLO, stores the request URL and the storage location of a corresponding Web content in the extracted Web content information table 124.

In accordance with the contents of the SLO setting information table 123 and the contents of the extracted Web content information table 124, the SLO monitor unit 115 notifies the running manager of the existence of the request URL exceeding SLO by using the display unit 102 of the running management terminal 101, or automatic load distribution is executed.

If automatic load distribution is to be executed, the load distribution execution unit 113 disposes a collection of the Web contents extracted from the management object Web contents 147 in the extracted Web contents 157 of the extracted business program 156, in accordance with the information on the extracted Web content information table 124.

The load distribution execution unit 113 further updates the request transfer information table 158 and URL mapping information table 159 of the additional installation candidate Web server 155, and if the additional installation candidate Web server 155 is not activated, activates the additional installation candidate Web server 155.

Thereafter, the load distribution execution unit 113 updates the URL assignment information table 191 and policy adoption information table 192 of the load distribution apparatus 142, and installs the additional installation candidate apparatus 153 into the Web system 141.

If automatic load distribution is not performed, the running manager performs load distribution manually by operating the input unit 103.

Next, with reference to FIGS. 3 to 11 (and FIG. 1 when necessary), description will be made on each screen and each table.

FIG. 3 shows an example of an SLO setting screen displayed on the display unit of the running management terminal. The SLO setting screen 301 is constituted of an add button 311, a delete button 312, a text field 321, a text field 322, a check box 323, a table 341, an OK button 351 and a cancel button 352.

The running manager performs each setting by using the input unit 103.

A URL pattern of a request to be managed is input to the text field 321, and SLO of an average response time corresponding to the URL pattern is input to the text field 322. The running manager decides this average response time properly in accordance with various conditions such as the type (text data, image data or the like) and size of the Web content.

The check box 323 is used for selecting whether or not load distribution is automatically executed when the management object request exceeds SLO of the average response time input to the text field 322. The running manager can select properly whether or not automatic load distribution is executed in accordance with various conditions, by using the check box 323.

As the add button 311 is depressed after these inputs and selections, the inputs and selections are reflected upon a URL pattern 332, an average response time 333 and an automatic load distribution 334 constituting a row of the table 341.

A row 342 shows an example of SLO setting contents. The URL pattern is "/shopping/", SLO of the average response time is 3 seconds, and the automatic load distribution is ON. In this case, load distribution is executed automatically when an actual average response time is longer than 3 seconds.

As the OK button 351 is depressed thereafter, the load distribution execution unit 113 stores the contents input and selected on the SLO setting screen 301 in the SLO setting information table 123 by using the SLO setting unit 114.

If the cancel button 352 is depressed, the input and selected contents are cancelled.

FIG. 4 is a diagram showing the details of the SLO performance information table in which the SLO monitor unit stores data. The SLO performance information table 122 is constituted of a request URL 411, an average response time 412, an average server response time 413 and the number 414 of accesses. Rows 421 and 422 show examples of the contents of the SLO performance information table 122.

The request URL 411 shows URL of each request received from a client 171.

The average response time 412 is an average of response times of respective request URLs.

The average server process time 413 is an average of server process times of respective request URLs.

The number 414 of accesses is the number of accesses of respective request URLs.

FIG. 5 is a diagram showing the details of the SLO setting information table in which the SLO setting unit stores data. The SLO setting information table 123 is constituted of a URL pattern 512, an average response time 513 and an automatic load distribution 514. A row 512 shows an example of SLO setting information and indicates that load distribution is automatically executed when the average response time of the URL pattern "/shopping/" becomes longer than 3 seconds.

Reverting to FIG. 4 (and FIG. 5 when necessary), description will be made on the contents of the rows 421 and 422.

The request URL 411 at the row 421 matches (is coincident with) the URL pattern "/shopping/" at the row 521 showing an example of the contents of the SLO setting information table 123, and indicates that the average response time is 3.897 seconds, the average server process time is 0.804 second and the number of accesses is 35464783.

The request URL 411 at the row 422 matches the URL pattern "/shopping/" at the row 521 showing an example of the contents of the SLO setting information table 123, and indicates that the average response time is 2.523 seconds, the average server process time is 2.304 seconds and the number of accesses is 35464782.

FIG. 6 is a diagram showing the details of the extracted Web content information table. The extracted Web content information table 124 is constituted of a URL 602, a host IP 603 and a Web content storage location 604.

A row 611 shows an example of the contents of the extracted Web content information table 124 and indicates that the Web content exists at C:¥somewhere1¥shopping¥img¥item1.jpg" of the host having IP address "192/168/10.24" if URL is "hppt://a.com/shopping/img/item1/jpg".

The URL pattern (request pattern) is a pattern of URL having specific information such as "/shopping/" in this embodiment. The URL pattern may be a whole address such as "http://a.com/shopping/img/item1.jpg".

FIG. 7 shows an example of a screen showing the extracted Web content information table. The URL 602, host IP 603 and Web content storage location 604 of the extracted Web content information table 124 shown in FIG. 6 are displayed in a URL 702, a host IP 703 and a Web content storage location 704, respectively, on the display unit 102 of the running management terminal 101.

The running manager can recognize information of the Web content having a high load by looking at this screen.

FIG. 8 is a diagram showing the details of the URL assignment information table in the load distribution apparatus.

The URL assignment information table 191 is constituted of a policy name 801, a URL pattern 803, a host group 805 and a host 807.

Rows 811 and 813 show examples of the contents of the URL assignment information table 191 after load distribution execution. The row 811 was set before load distribution execution, and indicates the contents that if the URL pattern is "/shopping/", the load distribution apparatus 142 charges the management object Web server having an IP address "192.168.10.24" with the load distribution process. The row 813 indicates the setting contents added after load distribution execution.

The host group 805 indicates the group to which the host belongs.

In this case, if the request URL pattern is "/shopping/img/item1.jpg", the load distribution apparatus 142 charges the management object server at the host (whose IP address is "192.168.10.26) newly added (installed) after load distribution execution with the load distribution process.

A policy name (name of a URL assignment pattern) is added to each setting at the rows 811 and 813. The row 811 is given a policy name "Policy1" and the row 813 is given a policy name "Policy2".

FIG. 9 is a diagram showing the details of the policy adoption information table in the load distribution apparatus.

The policy adoption information table 192 is constituted of a virtual IP address 901 and a policy adoption order 903.

A row 911 shows an example of the contents of the policy adoption information table 192 after load distribution execution.

The virtual IP address 901 (IP address 925) is an IP address (virtual IP address of the load distribution apparatus 142) to which the client 171 accesses via the Internet 181.

The policy adoption order 903 registers the order of policies to be adopted in the descending order.

As the client 171 accesses the virtual IP address 925, first the policy 921 is adopted and then a policy 923 is adopted. The detailed setting contents of the adoption policies 921 and 923 are stored in the URL assignment information table 191.

For example, as the client 171 issues a request including a request URL

"http://a.com/shopping/img/item1.jpg", the load distribution apparatus 142 tries to adopt the adoption policy 921. The detailed setting contents of the adoption policy 921 exist at the row 813 of the URL assignment information table 191. Since the URL pattern "/shopping/img/item1.jpg" at the row 813 matches the request URL from the client 171, the load distribution apparatus 142 charges the management object Web server at the host having the IP address "192.168.10.26" with the load distribution process.

In this manner, load distribution can be realized on the Web content unit basis.

FIG. 10 is a diagram showing the details of the request transfer information table possessed by the management object Web server.

The request transfer information table 148 is constituted of a URL pattern 1002, a host group 1003 and a host IP 1004.

A row 1011 shows an example of the contents of the request transfer information table 148. In this case, if a URL pattern is "/purchase/", the load distribution process is not executed at the management object Web server 145, but it is charged to an AP server at a host having an IP address of "192.168.1.21", "192.168.1.22" or "192.168.1.23".

FIG. 11 is a diagram showing the details of the URL mapping information table possessed by the management object Web server.

The URL mapping information table 149 is constituted of a URL pattern 1102 and a Web content storage folder 1103.

A row 1111 shows an example of the contents of the URL mapping information table 149, and indicates that if a URL pattern is "/shopping/", the Web contents designated by URL portions following "/shopping/" exist in a folder "C:¥somewhere1¥shopping".

Namely, for example, if a request URL is

"http://a.com/shopping/img/item1.jpg", the corresponding contents exist in the holder "C:¥somewhere1¥shopping¥img¥item1.jpg".

Each operation of the embodiment will be described with reference to FIGS. 12 to 16 (and FIG. 1 when necessary).

FIG. 12 is a flow chart illustrating performance monitoring to be executed by the load distribution apparatus in accordance with the SLO setting information.

First, the load distribution apparatus 142 receives a request from a client 171 via the Internet 181 and customer access network 161 (Step S1201).

Next, the load distribution apparatus 142 judges by referring to the SLO setting information table 193 whether the request URL matches the URL pattern of the SLO setting information, i.e., whether the request URL is a monitor object (Step S1211).

If the request URL is a monitor object (Yes at Step S1211), the load distribution apparatus 142 starts measuring a response time to the request, and records a start time T1 (Step S1221).

Next, the load distribution apparatus 142 sends the request to the management object Web server 145 to charge the management object Web server with URL request processing (Step S1231).

In succession, the load distribution apparatus 142 acquires the process results of the request URL and a server process time from the management object Web server 145 and transmits the process results to the client 171 (Step S1241).

Next, the load distribution apparatus 142 terminates the measurement of the response time and records an end time T2 (Step S1251).

Thereafter, the load distribution apparatus 142 acquires the response time by calculating T2-T1 where T1 was obtained at Step S1221 and T2 was obtained at Step S1251, and notifies the load distribution execution unit 113 of the request URL, response time and server process time (Step S1261).

By using the SLO monitor unit 15, the load distribution execution unit 113 updates the SLO performance information table 122 in accordance with the received request URL, response time and server process time.

In this manner, the SLO performance information table 122 can be updated.

If the request URL is not the monitor object (No at Step S1211), the load distribution apparatus 142 sends the request to the management object Web server 145 to charge the management object Web server with request URL processing (Step S1235), acquires the process results of the request URL from the management object Web server 145 and transmits the process results to the client 171 (Step S1245).

Figure 13:
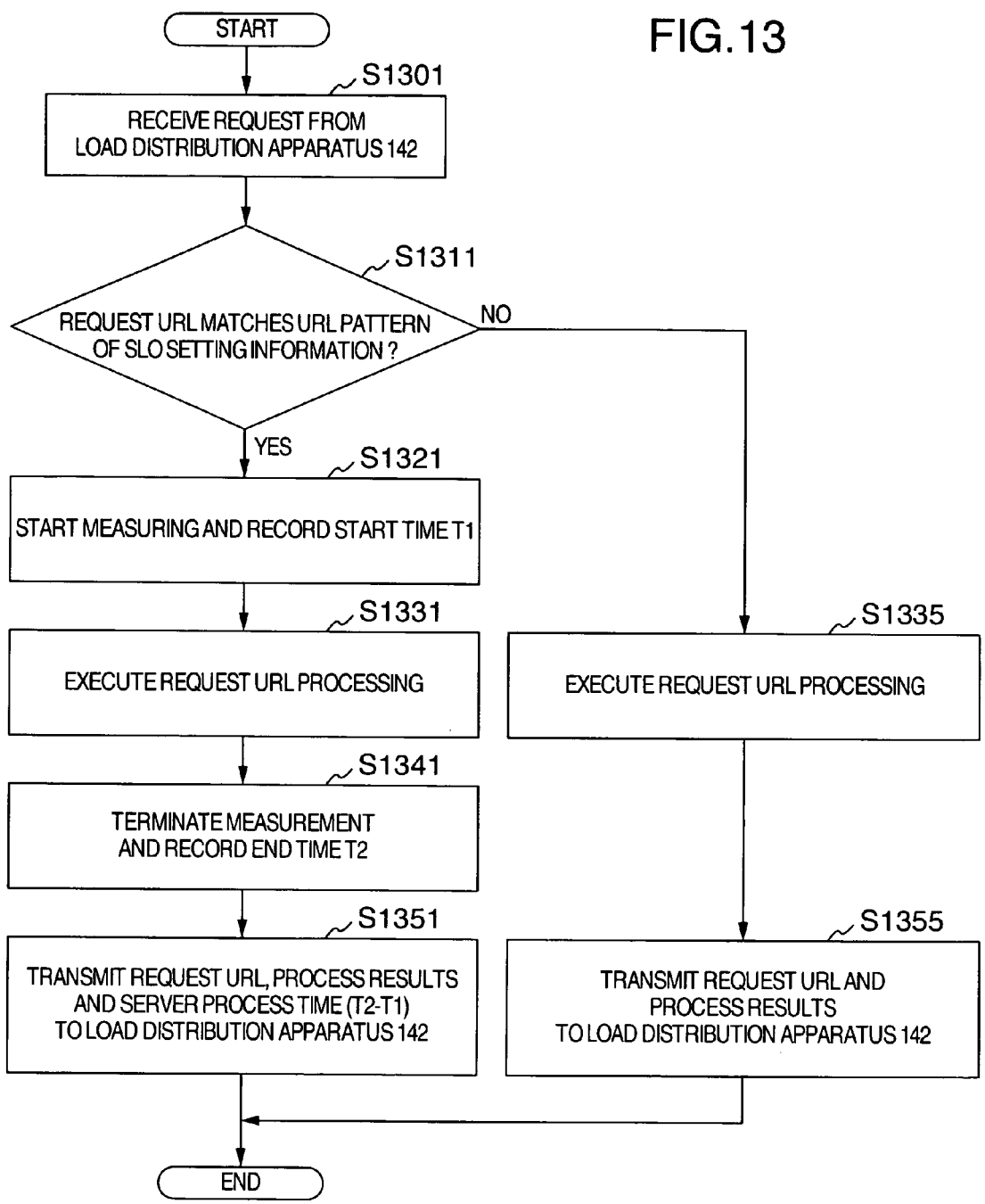
FIG. 13 is a flow chart illustrating a server process time measurement process to be executed by the management object Web server in accordance with the SLO setting information.

FIG. 13 is a flow chart illustrating a process of measuring the server process time in accordance with the SLO setting information, to be executed by the management object Web server. The measured server process time is used at Step S1241 shown in the flow chart of FIG. 12.

First, the management object Web server 145 receives the request from the load distribution apparatus 142 (Step S1301).

Next, the management object Web server 145 judges by referring to the SLO setting information table 194 whether the request URL matches the URL pattern of the SLO setting information, i.e., whether the request URL is a monitor object (Step S1311).

If the request URL is a monitor object (Yes at Step S1311), the management object Web server 145 starts measuring a server process time, and records a start time T1 (Step S1321).

Next, the management object Web server 145 executes request URL processing (Step S1331).

Thereafter, the management object Web server 145 terminates the measurement of the server process time, and records an end time T2 (Step S1341).

In succession, the management object Web server 145 acquires the server process time by calculating T2-T1 where T1 was obtained at Step S1321 and T2 was obtained at Step S1341, and transmits the request URL, corresponding process results and the server process time to the load distribution apparatus 142 (Step S1351).

In this manner, the management object Web server 145 can acquire the server process time.

If the request URL is not the monitor object (No at Step S1311), the management object Web server 145 executes request URL processing (Step S1335) and transmits the request URL and process results to the load distribution apparatus 142 (Step S1355).

Figure 14:
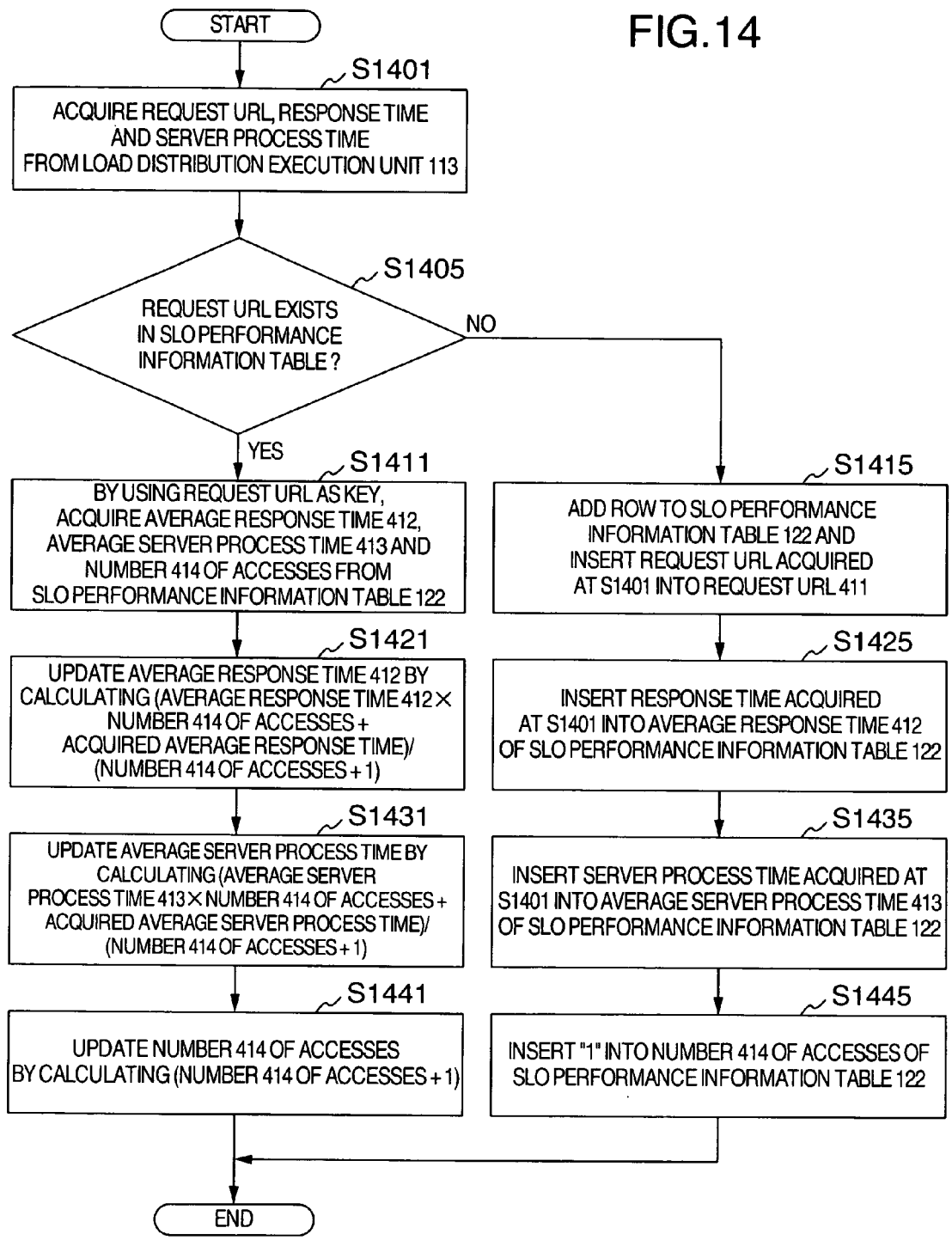
FIG. 14 is a flow chart illustrating an SLO performance information table updating process to be executed by an SLO monitor unit.

FIG. 14 is a flow chart illustrating a process of updating the SLO performance information table to be executed by the SLO monitor unit. The process illustrated in the flow chart of FIG. 14 is executed after the process at Step S1261 in the flow chart of FIG. 12.

First, the SLO monitor unit 115 acquires the request URL, response time and server process time from the load distribution execution unit 113 (Step S1401).

Next, the SLO monitor unit 115 judges whether the request URL acquired at Step S1401 exists in the SLO performance information table 122.

If the request URL exists in the SLO performance information table 122 (Yes at Step S1405), by using the request URL acquired at Step S1401 as a search key the SLO monitor unit 115 acquires the corresponding average response time 412, average server process time 413 and the number 414 of accesses from the SLO performance information table 122 (Step S1411).

In succession, the SLO monitor unit 115 updates the average response time 412 by calculating (average response time 412×the number 414 of accesses+response time acquired at Step S1401)/(the number 414 of accesses+1) (Step S1421).

Next, the SLO monitor unit 115 updates the average server process time 413 by calculating (average server process time 413×the number 414 of accesses+response time acquired at Step S1401)/(the number 414 of accesses+1) (Step S1431).

Thereafter, the SLO monitor unit 115 updates the number 414 of accesses by calculating (the number 414 of accesses+1) (Step S1441).

If the request URL does not exist in the SLO performance information table 122 (No at Step S1405), the SLO monitor unit 115 adds a row to the SLO performance information table 122 and inserts the request URL acquired at Step S1401 in the request URL 411 (Step S1415).

Next, the SLO monitor unit 115 inserts the response time acquired at Step S1401 into the average response time 412 at the same row added at Step S1415 (Step S1425), and inserts the server process time acquired at Step S1401 into the average server process time 413 at the same row added at Step S1415 (Step S1435).

Thereafter, the SLO monitor unit 115 inserts "1" into the number 414 of accesses at the same row added at Step S1415 (Step S1445).

In this manner, the SLO performance information table 122 can be updated.

Figure 15:
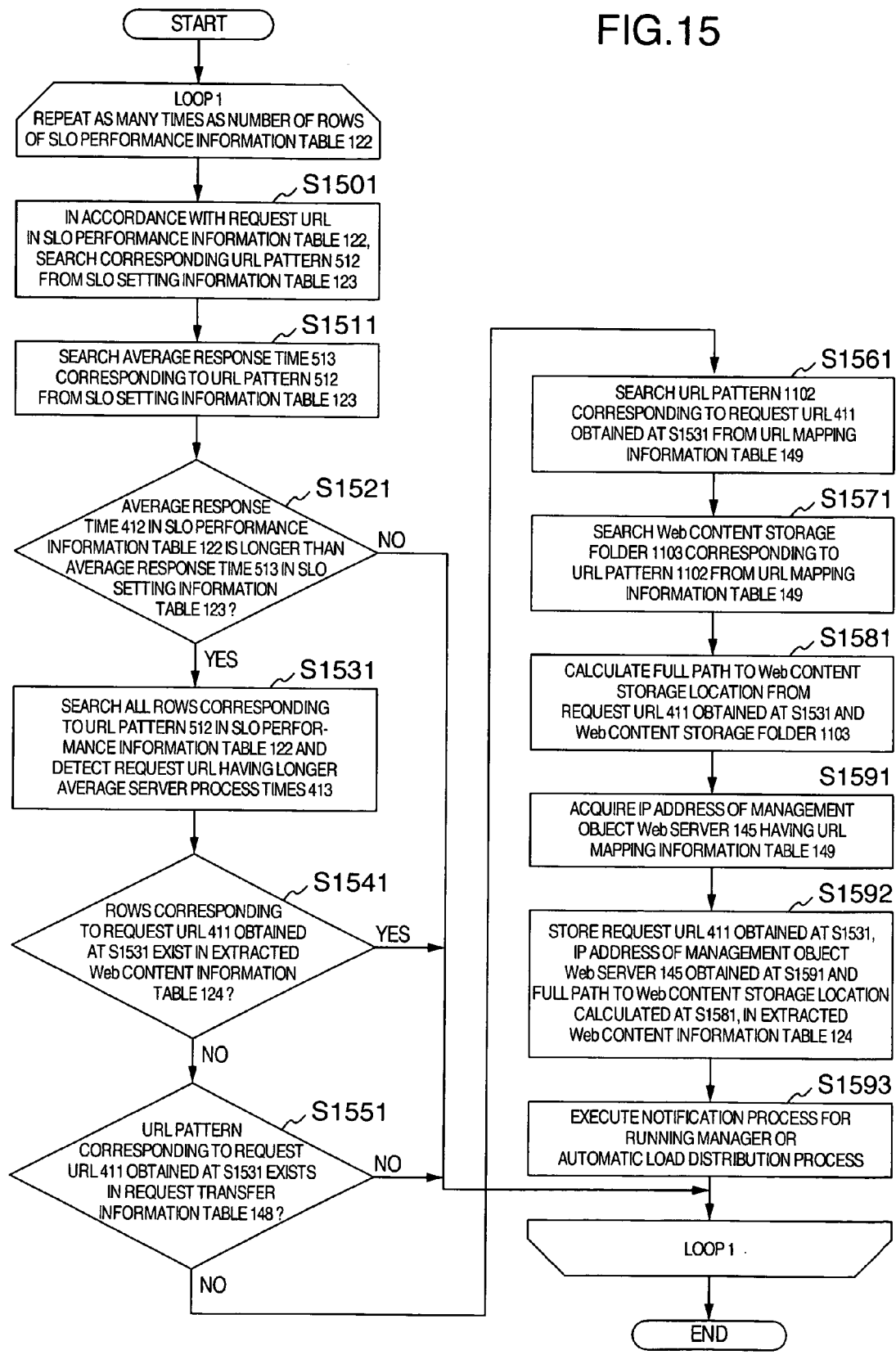
FIG. 15 is a flow chart illustrating a process of generating an extracted Web content information table from the SLO performance information table, to be executed by the SLO monitor unit.

FIG. 15 is a flow chart illustrating a process of creating the extracted Web content information table from the SLO performance information table, to be executed by the SLO monitor unit.

In the process of creating the extracted Web content information table 124 illustrated in the flow chart of FIG. 15, the SLO monitor unit 115 executes the following Steps for each row of the SLO performance information table 122.

First, in accordance with the request URL 411 in the SLO performance information table 122, the SLO monitor unit 115 searches a corresponding URL pattern 512 from the SLO setting information table 123 (Step S1501).

Next, the SLO monitor unit 115 searches the average response time 513 corresponding to the URL pattern 512 from the SLO setting information table 123 (Step S1511).

In succession, the SLO monitor unit 115 judges whether the average response time 412 in the SLO performance information table 122 is longer than the average response time 513 searched at Step S1511 (Step S1521).

If the average response time 412 is longer than the average response time 513 (Yes at Step S1521), the SLO monitor unit 115 searches all rows corresponding to the URL pattern 512 in the SLO performance information table 122 to detect request URLs 411 having longer average server process times 413 (Step S1531).

The request URLs 411 having longer average server process times 413 are, for example, request URLs 411 having upper 10% of longer average server process times 413, request URLs 411 having average server process times 413 longer than 2 seconds, or the like.

Next, the SLO monitor unit 115 checks whether there is a row corresponding to the request URL 411 obtained at Step S1531 in the extracted Web content information table 124 (Step S1541).

If the row does not exist in the extracted Web content information table 124 (No at Step S1541), the SLO monitor unit 115 checks whether there is a URL pattern corresponding to the request URL 411 obtained at Step S1531 in the request transfer information table 148 (Step S1551).

If the row exists in the extracted Web content information table 124 (Yes at Step S1541), it is not necessary to update the extracted Web content information table 124 because the row corresponding to the request URL 411 exists already in the extracted Web content information table 124.

Step S1551 is a process unique to the Web system on the basis of J2EE (registered trademark). If the search result at Step S1551 indicates that a corresponding URL pattern exists, it means that the corresponding Web content exists in a business program installed in an AP server.

Namely, if load distribution is to be performed by extracting a high load Web content in the AP server, it is necessary to change settings of a Web server in correspondence with the AP server to which load is distributed and to re-activate the Web server so that the Web system halts temporarily.

Since this embodiment assumes load distribution for a Web server of 24-hour non-stop and no re-activation, the description is directed to load distribution for the Web server. However, Step S1551 can judge whether a request is directed to a Web server or an AP server, this embodiment can be modified to load distribution for an AP server.

If the corresponding row does not exist (No at Step S1551), the SLO monitor unit 115 searches the URL pattern 1102 corresponding to the request URL 411 obtained at Step S1531 from the URL mapping information table 149 (Step S1561).

Next, the SLO monitor unit 115 searches the Web content storage holder 1103 corresponding to the URL pattern 1102 obtained at Step S1561 from the URL mapping information table 149 (Step S1571).

In succession, the SLO monitor unit 115 calculates a full path to the Web content storage location from the request URL 411 obtained at Step S1531 and the Web content storage folder 1103 obtained at Step S1571 (Step S1581).

Next, by using the running system control unit 116 possessed by the load distribution execution unit 113, the SLO monitor unit 115 communicates with the management agent 144 in the management object apparatus 143 to acquire an IP address of the management object Web server 145 having the URL mapping information table 149 (Step S1591).

In succession, the SLO monitor unit 115 stores, in the extracted Web content information table 124, the request URL 411 obtained at Step S1531, the IP address of the management object Web server 145 obtained at Step S1591 and the full path to the Web content storage location calculated at Step S1581 (Step S1592).

In this manner, the SLO monitor unit 115 can create the extracted Web content information table 124.

Thereafter, the SLO monitor unit 115 executes a notification process for the running manager or an automatic load distribution process (Step S1593).

Figure 16:
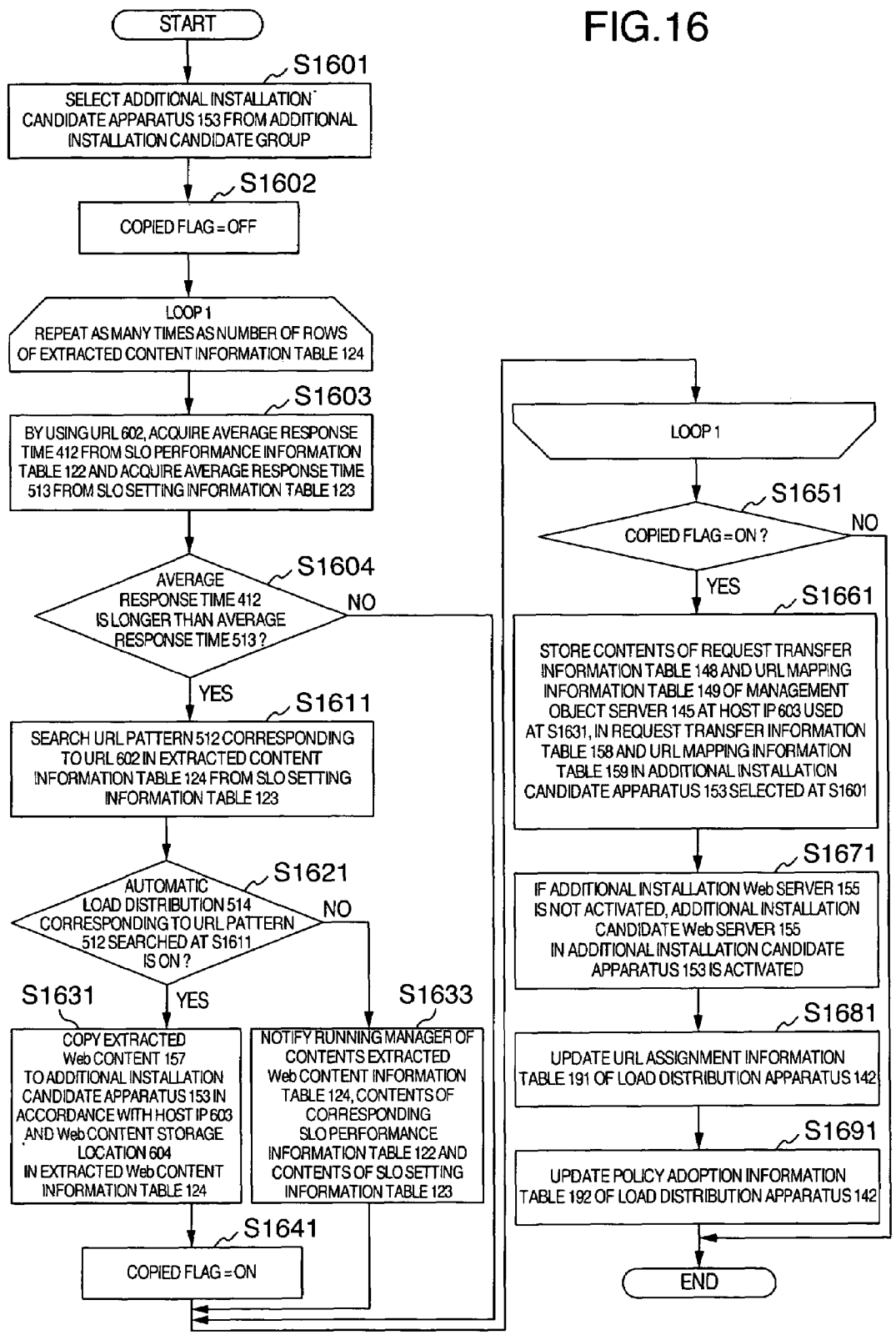
FIG. 16 is a flow chart illustrating a method of notifying a running manager of extracted high load Web contents and automatically distributing loads.

In this embodiment, although the process at Step S1593 is executed after Step S1592, the load distribution execution unit 113 may execute the process at Step S1593 by referring to the extracted Web content information table 124, as shown in the flow chart of FIG. 16. The process at Step S1593 may be executed in accordance with SLO settings made by the running manager.

FIG. 16 is a flow chart illustrating a method of notifying a running manager of an extracted high load Web content and an automatic load distribution method, to be executed in accordance with a presence/absence of automatic load distribution set in the SLO setting information table.

First, the load distribution execution unit 113 selects an additional installation candidate apparatus 153 from the additional installation candidate group 151 (Step S1601) and stores this information in a memory (corresponding to the storage unit 202 in FIG. 2).

Next, the load distribution execution unit 113 sets a copied flag OFF, the copied flag indicating whether the extracted Web content was copied or not (Step S1602), and stores this information in the memory (corresponding to the storage unit 202 in FIG. 2).

The load distribution execution unit 113 repeats the processes at Steps S1603 to S1641 as many times as the number of rows of the extracted Web content information table 124.

The load distribution execution unit 113 acquires the average response time 412 from the SLO performance information table 122 and the average response time 513 from the SLO setting information table 123 in accordance with URL 602 in the extracted Web content information table 124 (Step S1603), and judges whether the average response time 412 is longer than the average response time 513 (Step S1604).

The Web content in the extracted Web content information table 124 is the Web content extracted in the flow chart of FIG. 11 because the average response time 412 is longer than the average response time 513. However, since there is a time lag between extraction of the Web content and load distribution execution of the Web content, it is judged again at this Step S1604 whether the average response time 412 of the Web content is longer than the average response time 513.

If the average response time 412 is longer than the average response time 513 (Yes at Step S1604), the load distribution execution unit 113 searches a URL pattern 512 corresponding to URL 602 in the extracted Web content information table 124 from the SLO setting information table 123 (Step S1611).

Next, the load distribution execution unit 113 judges whether the automatic load distribution 514 corresponding to the URL pattern 512 searched at Step S1611 is ON (Step S1621).

If the automatic load distribution 514 is ON (Yes at Step S1621), the load distribution execution unit 113 copies the extracted Web content 157 of the extracted business program 156 to the additional installation candidate apparatus 153, in accordance with the host IP 603 and Web content storage location 604 in the extracted Web content information table 124 (Step S1631) and sets the copied flag ON (Step S1641).

If the automatic load distribution 514 is OFF (No at Step S1621), by using the user interface unit 112 the load distribution execution unit 113 displays the contents of the extracted Web content information table 124, the contents of the corresponding SLO performance information table 122 and the contents of the corresponding SLO setting information table 123, on the display unit 102 of the running management terminal 101, to thereby notify the contents to the running manager (Step S1633).

Next, the load distribution execution unit 113 judges whether the copied flag is ON, i.e., whether the process at Step S1641 is executed once (Step S1651).

If Yes at Step S1651, the load distribution execution unit 113 stores the contents of the request transfer information table 148 and URL mapping information table 149 in the management object Web server 145 at the host IP 603 used at Step S1631, in the request transfer information table 158 and URL mapping information table 159 of the additional installation candidate apparatus 153 selected at Step S1601, respectively (Step S1661).

Thereafter, by using the running system control unit 116, the load distribution execution unit 113 activates the additional installation candidate Web server 155 in the additional installation candidate apparatus 153 (Step S1671), updates the URL assignment information table 191 of the load distribution apparatus 142 (Step S1681) and updates the policy adoption information table 192 of the load distribution apparatus 142 (Step S1691), to thereby complete the load distribution.

If No at Step S1651, the running manager operates the input unit 103 of the running management terminal 101 so that load distribution can be performed manually by using the load distribution execution unit 113.

In this manner, load distribution for a high load Web content can be manually or automatically performed.

As described so far, according to the embodiment, since only an extracted high load Web content is disposed to an object server, the performance can be improved by a smaller number of servers (or hosts) than conventional load distribution through additional installation on the business application unit basis. Since the installation time can be shortened, load distribution in an urgent case is also possible.

In the description of the embodiment, although it is assumed that the additional installation candidate apparatus groups 151 has additional installation candidate apparatuses 153, there is a case in which there is no additional candidate apparatus (computer) from the reason that the number of running apparatuses (computers) is limited or from other reasons. In this case, a running manager may register an additional installation candidate apparatus in the running management system 111 by considering the load state of each management object apparatus (computer) in the Web system 141, or the like, so that the load distribution can be performed by the method described with reference to FIG. 16.

Since a request for a particular high load Web content is assigned to an additionally installed server, a response time to the Web content not having a high load in the business program can be improved more than a conventional response time.

The embodiment has been described above, and the features of the present invention are not limited to the embodiment. For example, instead of using a load distribution apparatus, the invention is applicable to load distribution of a round robin system.

The structures of each apparatus, each program and each flow chart can be modified (integrated, separated, etc.) in various ways without departing from the scope and spirit of the present invention.

According to the present invention, load of a computer system can be efficiently distributed.

The invention claimed is:

1. A computer control method for a computer system having a load distribution apparatus, a plurality of computers for responding to a request from a client and a running management computer for managing said load distribution apparatus and said plurality of computers, wherein:

said running management computer includes a storage unit and a processing unit;

said storage unit stores a target time value of performance information on a response time from receiving said request at said load distribution apparatus to transmitting a result processed by a computer among said plurality of computers in response to said request, inputted into said running management computer for each URL pattern of said request, said target time value of the performance information including an average response time to said request and an average process time of each of said plurality of computers for said request; and said processing unit monitors the performance information on the response time to said request, for each URL pattern of said request, and judges whether or not the monitored performance information read from said storage unit satisfies the target time value of the performance information, to execute load distribution by copying a Web content corresponding to the URL pattern of said request not satisfying the target time value of the performance information, to another computer for handling.

2. The computer control method according to claim 1, wherein:

each of said plurality of computers has either a Web program or an application program and a request transfer information table for storing a correspondence between the URL pattern of said request and a computer to which said request is transferred; and said processing unit searches in said request transfer information table by using a URL pattern of said request not satisfying the target time value of the performance information and, when no URL pattern of said request not satisfying the target time value of the performance information is found, judges that a Web content is disposed in the computer having the Web program and executes said load distribution.

3. The computer control method according to claim 1, wherein:

said storage unit stores an extracted Web content information table for storing a correspondence among the URL pattern of said request not satisfying the target time value of the performance information, a storage location of said Web content corresponding to the URL pattern of said request, and an IP address of a computer having a storage location of said Web content; and said processing unit searches in said extracted Web content information table by using a URL pattern of said request not satisfying the target time value of the performance information to acquire an IP address of a computer having a storage location of said Web content corresponding to the URL pattern and a storage location of said Web content corresponding thereto, copies said Web content to one or a plurality of computers, and sets information on pairs of URL patterns of said Web content and said storage location of said computer having copy of said Web content in said one or a plurality of computers.

4. The computer control method according to claim 1, wherein:

said processing unit sets information of pairs of the URL pattern of said Web content and an IP address of said another computer.

5. A computer system comprising:

a plurality of computers for responding to a request from a client; and a running management computer for managing said load distribution apparatus and said plurality of computers, wherein:

said running management computer includes a storage unit and a processing unit;

said storage unit stores a target time value of performance information on a response time from receiving said request at said load distribution apparatus to transmitting a result processed by a computer among said plurality of computers in response to said request, inputted into said running management computer for each URL pattern of said request; and said processing unit monitors the performance information on the response time to said request, for each URL pattern of said request, judges whether or not the monitored performance information read from said storage unit satisfies the target time value of the performance information, displays a URL pattern of said request not satisfying the target time value of the performance information, a WEB content corresponding to the URL pattern, and another target time value of performance information corresponding to the URL pattern, on a display unit of a running management terminal connected to said running management computer, and executes load distribution by copying said Web content to another computer for handling when load distribution execution is input from an input unit of said running management terminal.

6. A computer system comprising:

a load distribution apparatus;

a plurality of computers for responding to a request from a client; and a running management computer for managing said load distribution apparatus and said plurality of computers, wherein:

said running management computer includes a storage unit and a processing unit;

said storage unit stores a target time value of performance information on a response time from receiving said request at said load distribution apparatus to transmitting a result processed by a computer among said plurality of computers in response to said request, inputted into said running management computer for each URL pattern of said request, said target time value of the performance information including an average response time to said request and an average process time of each of said plurality of computers for said request; and said processing unit monitors the performance information on the response time to said request, for each URL pattern of said request, and judges whether or not the monitored performance information read from said storage unit satisfies the target time value of the performance information, to execute load distribution by copying a Web content corresponding to the URL pattern of said request not satisfying the target time value of the performance information, to another computer for handling.

7. The computer system according to claim 6, wherein:

each of said plurality of computers has either a Web program or an application program and a request transfer information table for storing a correspondence between the URL pattern of said request and a computer to which said request is transferred; and said processing unit searches in said request transfer information table by using a URL pattern of said request not satisfying the target time value of the performance information and, when no URL pattern of said request not satisfying the target time value of the performance information is found, judges that a Web content is disposed in the computer having the Web program and executes said load distribution.

8. The computer system according to claim 6, wherein:

said storage unit stores an extracted Web content information table for storing a correspondence among the URL pattern of said request not satisfying the target time value of the performance information, a storage location of said Web content corresponding to the URL pattern of said request, and an IP address of a computer having a storage location of said Web content; and said processing unit searches in said extracted Web content information table by using a URL pattern of said request not satisfying the target time value of the performance information to acquire an IP address of a computer having a storage location of said Web content corresponding to the URL pattern and a storage location of a computer having a storage location of said Web content corresponding thereto, copies said Web content to one or a plurality or computers, and sets information on pairs of URL patterns of said Web content and said storage location of said computer having copy of said Web content in said one or a plurality of computers.

9. The computer system according to claim 6, wherein:

said processing unit sets information of pairs of the URL pattern of said Web content and an IP address of said another computer.

10. A computer control method for a computer system having a load distribution apparatus, a plurality of computers for responding to a request from a client, and a running management computer for managing said load distribution apparatus and said plurality of computers, wherein:

said running management computer includes a storage unit and a processing unit;

said storage unit stores a target time value of performance information on a response time from receiving said request at said load distribution apparatus to transmitting a result processed by a computer among said plurality of computers in response to said request, inputted into said running management computer for each URL pattern of said request; and said processing unit monitors the performance information on the response time to said request, for each URL pattern of said request, judges whether or not the monitored performance information read from said storage unit satisfies the target time value of the performance information, displays a URL pattern of said request not satisfying the target time value of the performance information, a Web content corresponding to the URL pattern, and another target time value of performance information corresponding to the URL pattern, on a display unit of a running management terminal connected to said running management computer, and executes load distribution by copying said Web content to another computer for handling when load distribution execution is input from an input unit of said running management terminal.

* * * * *